(12) United States Patent
Liang et al.

(10) Patent No.: US 11,679,681 B2
(45) Date of Patent: Jun. 20, 2023

(54) REMOTE CONTROLLABLE HYBRID ENERGY STORAGE VEHICLE

(71) Applicant: Hung Chang International Energy Co., Ltd., Kaohsiung (TW)

(72) Inventors: Chin-Tsai Liang, Kaohsiung (TW); Chiung-Tan Hsu, Kaohsiung (TW)

(73) Assignee: HUNG CHANG INTERNATIONAL ENERGY CO., LTD., Kaohsiung (TW)

(*) Notice: Subject to any disclaimer, the term of this patent is extended or adjusted under 35 U.S.C. 154(b) by 161 days.

(21) Appl. No.: 17/396,153

(22) Filed: Aug. 6, 2021

(65) Prior Publication Data
US 2022/0041060 A1 Feb. 10, 2022

(30) Foreign Application Priority Data
Aug. 7, 2020 (TW) .................. 109126913

(51) Int. Cl.
| | | |
|---|---|---|
| *B60L 8/00* | (2006.01) | |
| *B60K 6/26* | (2007.10) | |
| *B60K 6/387* | (2007.10) | |
| *B60Q 9/00* | (2006.01) | |
| *B60R 15/00* | (2006.01) | |
| *B62D 59/04* | (2006.01) | |
| *B60L 50/61* | (2019.01) | |
| *B60L 53/22* | (2019.01) | |

(Continued)

(52) U.S. Cl.
CPC .............. *B60L 8/003* (2013.01); *B60K 6/26* (2013.01); *B60K 6/387* (2013.01); *B60L 50/61* (2019.02); *B60L 53/22* (2019.02); *B60Q 9/00* (2013.01); *B60R 15/00* (2013.01); *B62D 59/04* (2013.01); *F15B 15/18* (2013.01); *B60Y 2200/92* (2013.01); *G01S 19/14* (2013.01)

(58) Field of Classification Search
CPC .......... B60L 8/003; B60L 50/61; B60L 53/22; B60K 6/26; B60K 6/387; B60Q 9/00; B60R 15/00; B62D 59/04; F15B 15/18
See application file for complete search history.

(56) References Cited

U.S. PATENT DOCUMENTS

| | | | | |
|---|---|---|---|---|
| 9,389,007 B1 * | 7/2016 | McKay | ................. | F25B 47/025 |
| 11,312,463 B2 * | 4/2022 | Rikoski | .................. | H02S 40/38 |

(Continued)

*Primary Examiner* — John D Walters
(74) *Attorney, Agent, or Firm* — Muncy, Geissler, Olds & Lowe, P.C.

(57) ABSTRACT

An energy storage vehicle includes a solar cell, a power storage equipment, an engine, a transmission module, an electric motor, a pump, a hydraulic motor, a remote control module, and a generator. The transmission module includes an input terminal, a first output terminal, a first clutch, a second output terminal, and a second clutch. The input terminal of the transmission module is driven by the engine. The power storage equipment is configured to store the electrical energy generated by the solar cell and the generator. The power storage equipment is electrically connected to the first electric motor. The hydraulic motor drives multiple wheels of the energy storage vehicle under the control of the remote control module. The remote control module is configured to control the power output of the hydraulic motor and the orientation of the wheels of the energy storage vehicle.

9 Claims, 8 Drawing Sheets

(51) Int. Cl.
*F15B 15/18* (2006.01)
*G01S 19/14* (2010.01)

(56) References Cited

U.S. PATENT DOCUMENTS

2015/0027339 A1* 1/2015 Lamba .................... B61C 17/06
  105/35
2020/0369334 A1* 11/2020 Lee .......................... B60K 1/04

* cited by examiner

REMOTE CONTROLLABLE HYBRID ENERGY STORAGE VEHICLE

BACKGROUND OF THE INVENTION

1. Field of the Invention

The invention generally relates to an energy storage vehicle. Particularly, the invention relates to a remote controllable hybrid energy storage vehicle.

2. Description of the Prior Art

Since the second industrial revolution, human civilization has developed rapidly with the application of electric power, and the importance of electric power supply technology goes without saying.

As the main power supply facility, power plants have a profound history of development. From traditional hydroelectric power plants, coal-fired power plants, natural gas power plants to modern nuclear power plants and power generation facilities that draw on solar or other green energy, power generation technology has developed a variety of flourishing forms.

In recent years, with the rise of environmental protection awareness, green energy has achieved unprecedented benefits. However, mobile green energy generation methods are not yet abundant. Especially as the environment changes, the inventor of the present invention is deeply enthusiastic about how to use green energy to deal with natural disasters. Therefore, focusing on the improvement of the mobility of green energy power generation facilities in disaster environments, they have conducted intensive research.

SUMMARY OF THE INVENTION

One object of the present invention is to provide a solar power generation facility that can have good mobility even in disaster-stricken areas.

To achieve the above object, in an embodiment of the present invention, an energy storage vehicle may include a solar cell, a power storage equipment, an engine, a transmission module, an electric motor, a pump, a hydraulic motor, and a generator. The transmission module may include an input terminal, a first output terminal, a first clutch, a second output terminal, and a second clutch. The input terminal of the transmission module is driven by the engine. The first clutch is disposed on the first output terminal of the transmission module. The second clutch is disposed on the second output terminal of the transmission module. The electric motor is connected to the first output terminal of the transmission module through the first clutch. The hydraulic motor is connected to the electric motor. The generator is connected to the second output terminal of the transmission module through the second clutch. The solar cell is disposed on top surface of the energy storage vehicle. The power storage equipment is configured to store electrical energy generated by the solar cell and the generator. The power storage equipment is electrically connected to the electric motor. The hydraulic motor drives wheels of the energy storage vehicle.

In the above embodiment, the high torque output of the hydraulic motor ensures the climbing force of the energy storage vehicle. In addition, the hybrid power design allows the energy storage vehicle to have a stable power source even in the absence of sunlight.

DETAILED DESCRIPTION OF THE PREFERRED EMBODIMENT

The terms "first", "second", "third", and so on may be used in the disclosure, but these terms do not specifically refer to order or sequence and not used to limit the invention. Such terms are merely used to differentiate an element or an operation from another element or operation.

It will be appreciated that for simplicity and clarity of illustration, elements shown in the figures have not necessarily been drawn to scale. For example, the dimensions of some of the elements may be exaggerated relative to other elements for clarity.

Figure 1:
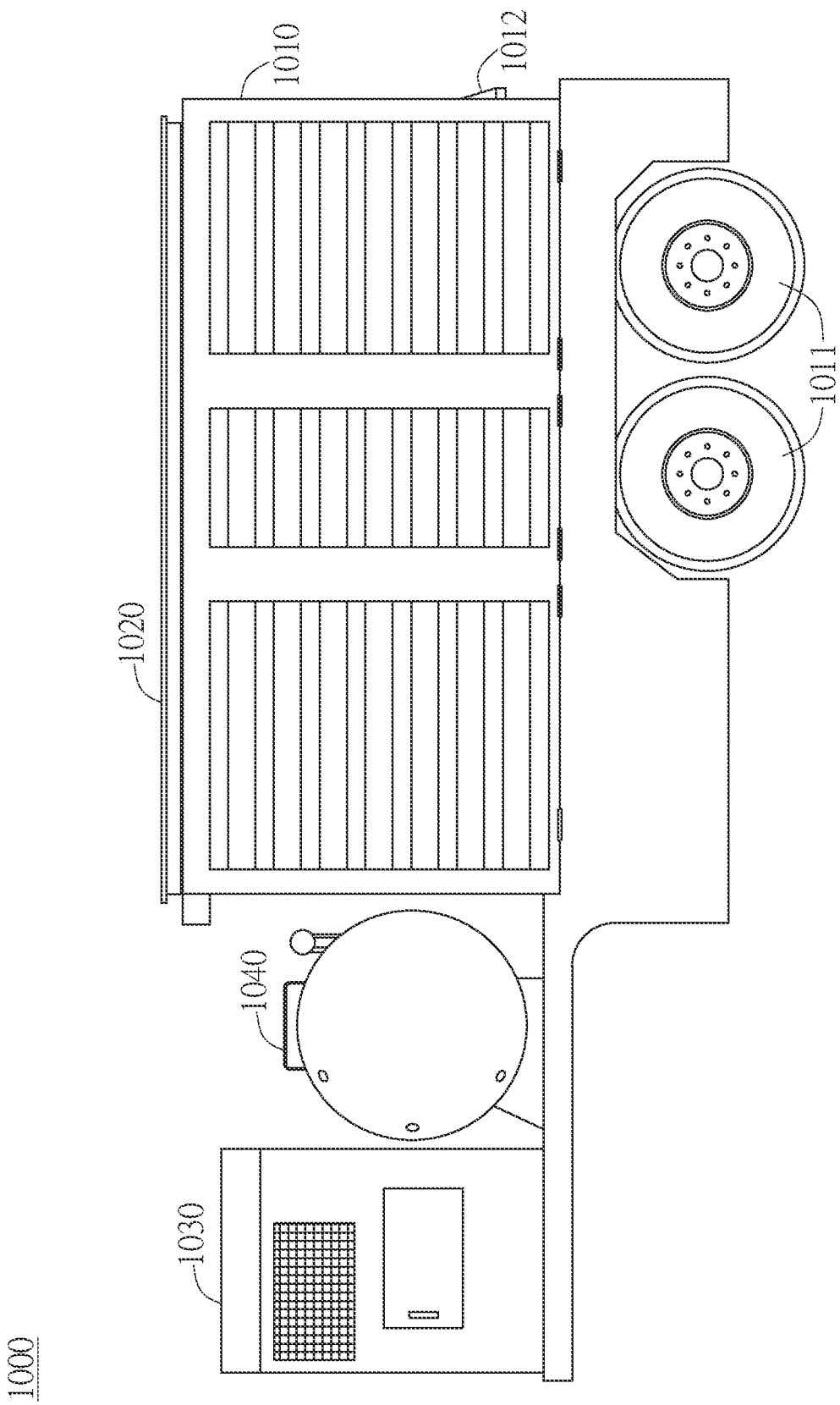
FIG. 1 is a schematic view of an energy storage vehicle according to an embodiment of the present invention.

Please refer to FIG. 1. In an embodiment of the present invention, an energy storage vehicle 1000 may include a car body 1010, a solar cell 1020 disposed on a top surface of the car body, and a power storage equipment 1030, and multiple wheels 1011 are disposed on the car body 1010. Optionally, in another embodiment, the energy storage vehicle 1000 may further include a power socket 1012 and a water tank 1040. In this embodiment, the power storage equipment 1030 may store the electric energy generated by the solar cell 1020. The power socket 1012 may provide AC or DC power from the electric energy stored in the power storage equipment 1030.

Figure 2:
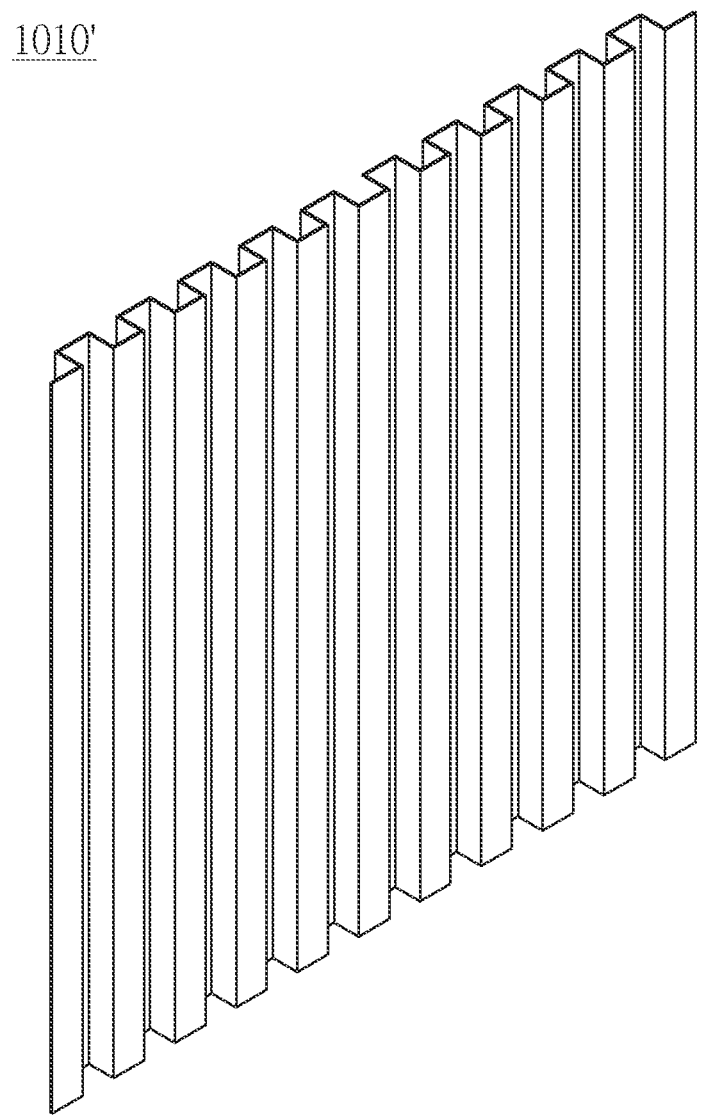
FIG. 2 is a schematic view of a plate of the car body of the energy storage vehicle according to an embodiment of the present invention.

In order to increase the mobility of the energy storage vehicle 1000, the present invention carries out a lightweight design on the car body 1010. For example, FIG. 2 shows a car-body plate 1010' of the energy storage vehicle body according to the embodiment of the present invention. As shown in FIG. 2, in this embodiment, the plate 1010' has a square wave structure, so its structural strength is stronger than that of a flat plate of the same material. For example, with the square wave structure shown in FIG. 2, the metal plate made of lightweight materials, such as aluminum plates, can achieve a structural strength equivalent to that of a flat steel plate. In other words, under the same structural strength requirement, the car body made of the plate 1010' with the square wave structure can be lighter than the car body made of a flat plate, so that the mobility of the energy storage vehicle can be improved.

Figure 3:
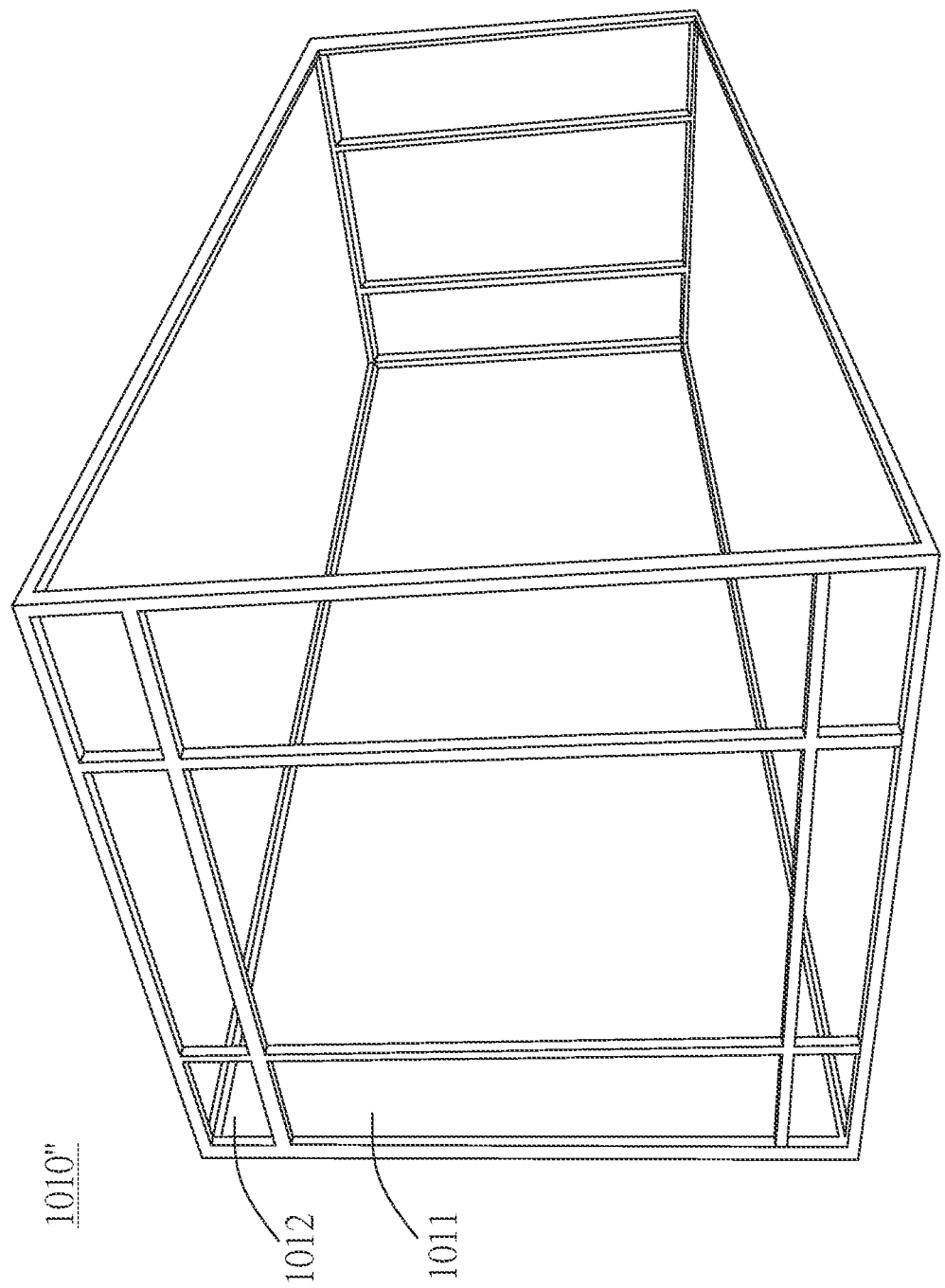
FIG. 3 is a schematic view of a skeleton of the car body of the energy storage vehicle according to an embodiment of the present invention.

Please refer to FIG. 1 to FIG. 3. In order to strengthen the structure of the energy storage vehicle 1000, in this embodiment, a skeleton 1010" can be used to construct the car body 1010. As shown in FIG. 3, in this embodiment, the skeleton 1010" may define multiple openings suitable for the plate to be embedded thereon, such as opening 1011 and opening 1012. As shown in FIG. 3, the openings defined by the skeleton 1010" may have different sizes, and the opening may have a rectangular shape, but not limited thereto. In FIG. 3, the opening 1011 and the opening 1012 are merely referred as an example. The openings defined by the skeleton 1010" may be embedded with one or more of the plates 1010'. It should be noted that the skeleton 1010" is not limited to the configuration shown in FIG. 3. In other embodiments, the skeleton of the present invention may define different numbers of openings and different aspect ratios of openings. Due to the structural design of the skeleton 1010", the structural strength of the car body can be improved.

Figure 4:
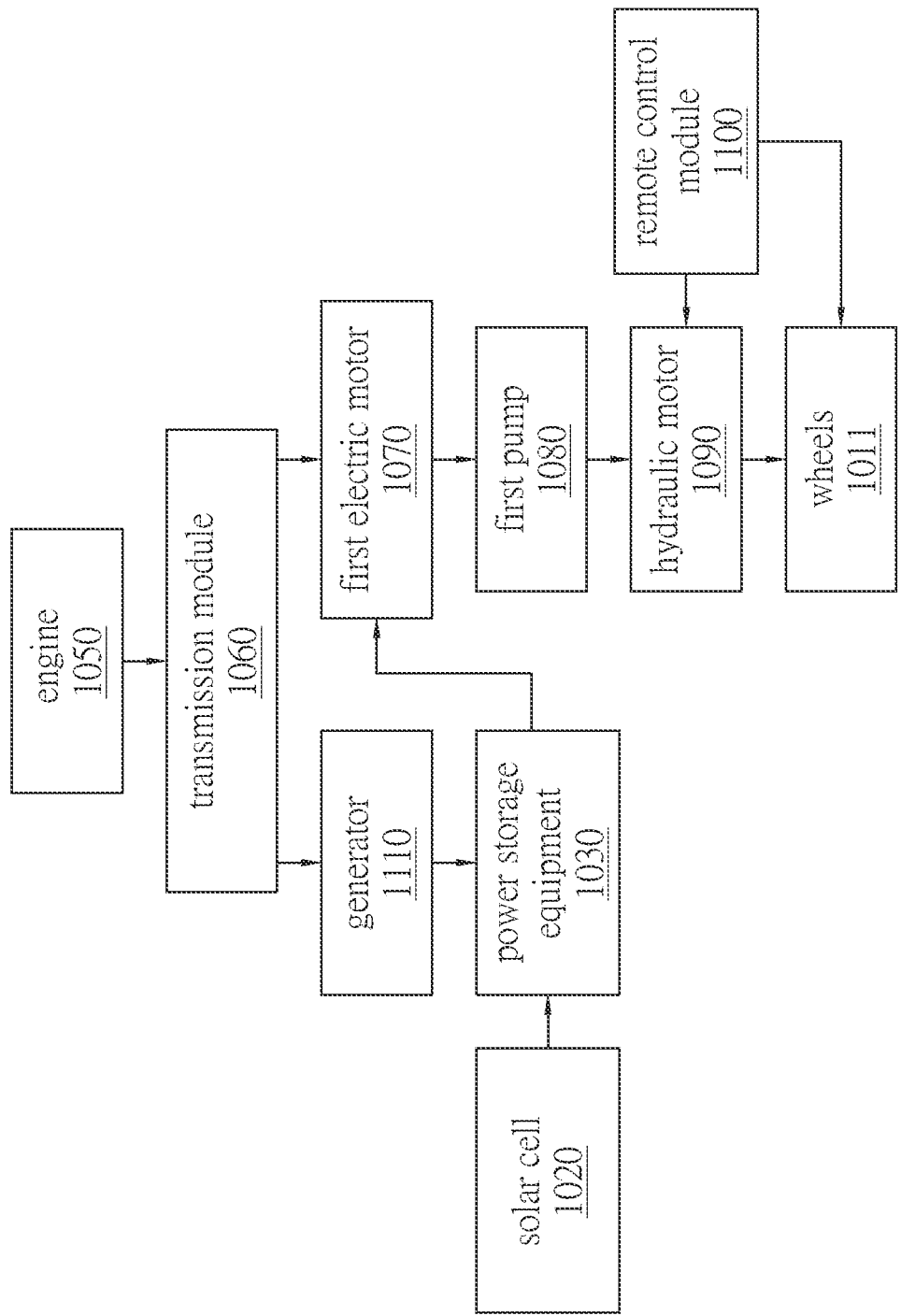
FIG. 4 is a block diagram of a power system of the energy storage vehicle according to an embodiment of the present invention.

FIG. 4 shows a block diagram of a power system of the energy storage vehicle according to an embodiment of the present invention. Please refer to FIG. 1 and FIG. 4. In this embodiment, an engine 1050, a transmission module 1060, a first electric motor 1070, a first pump 1080, a hydraulic motor 1090, and a generator 1110 may be disposed in the car body 1010 or on top of the car body 1010 (not shown in FIG. 1).

In this embodiment, the transmission module 1060 may include an input terminal and two output terminal (e.g. a first output terminal connected to the first electric motor 1070 and a second output terminal connected to the generator 1110, respectively). A first clutch is disposed on the first output terminal of the transmission module 1060. A second clutch is disposed on the second output terminal of the transmission module 1060 (not shown in FIG. 4). Specifically, the first electric motor 1070 is connected to the first output terminal of the transmission module 1060 through the first clutch. The generator 1110 is connected to the second output terminal of the transmission module 1060 through the second clutch. Please refer to FIG. 4. The engine 1050 drives the input terminal of the transmission module 1060, and then (in the case that the first clutch and the second clutch are engaged) drives the first electric motor 1070 connected to the first output terminal of the transmission module 1060 and the generator 1110 connected to the second output terminal of the transmission module 1060. As such, the generator 1110 is driven to generate electric energy, and the electric energy generated by the generator 1110 may be stored by the electric storage equipment 1030 together with the electric energy generated by the solar cell 1020. At the same time, the first electric motor 1070 may drive the first pump 1080 to activate the hydraulic motor 1090 and drive the wheels 1011. Due to the low-speed and high-torque characteristics of the hydraulic motor, the energy storage vehicle of the present invention has a strong climbing ability, so the energy storage vehicle can provide good maneuverability even in disaster-stricken areas.

In this embodiment, the first clutch may be disengaged, so that the first electric motor is no longer driven by the engine 1050 through the transmission module 1060, and the electric power stored in the electric storage equipment 1030 is used to drive the first electric motor 1070. When the first electric motor 1070, the first pump 1080, the hydraulic motor 1090, or the wheels 1011 are needed to be repaired or replaced, the engine 1050 is intended to drive the generator 1110 to store electric energy, the first clutch may be disengaged while the second clutch remains engaged.

Optionally, in another embodiment, a one-way flywheel may be provided between the first electric motor 1070 and the transmission module 1060. Therefore, when the first electric motor is switched from the higher rpm (revolutions per minutes) electric mode (in which the first clutch is disengaged) to the lower rpm engine driving mode (in which the first clutch is engaged), the inertia of the one-way flywheel may be used to improve the efficiency of power supply.

Please refer to FIG. 1 and FIG. 4 again. Optionally, in another embodiment, the energy storage vehicle 1000 may further include a remote control module 1100 (not shown in FIG. 1), which is disposed in the car body 1100 or on top of the car body 1100. In this embodiment, the remote control module 1100 may control the power output of the hydraulic motor 1090 and the orientation of the wheels 1011. Therefore, the energy storage vehicle 1000 may be driven to more dangerous areas through remote control manner, without the need for people to drive the energy storage vehicle 1000, reducing the risk of injury and death.

Figure 5A:
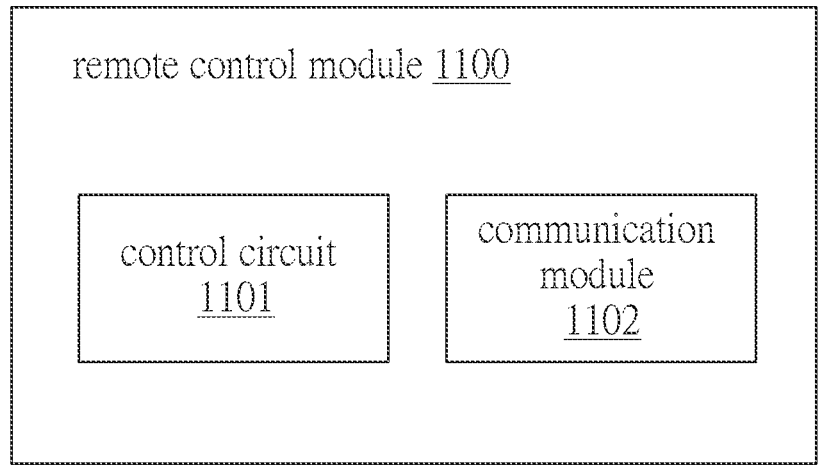
FIG. 5A is a block diagram of a remote control module according to an embodiment of the present invention.

Please refer to FIG. 5A. In an embodiment, the remote control module 1100 includes a control circuit 1101 and a communication module 1102. The remote control module 1100 may receive a control signal through the communication module 1102 and process the control signal received by the communication module 1102 through the control circuit 1101 to realize the control of the power output of the hydraulic motor 1090 and the orientation of the wheels 1011.

Figure 5B:
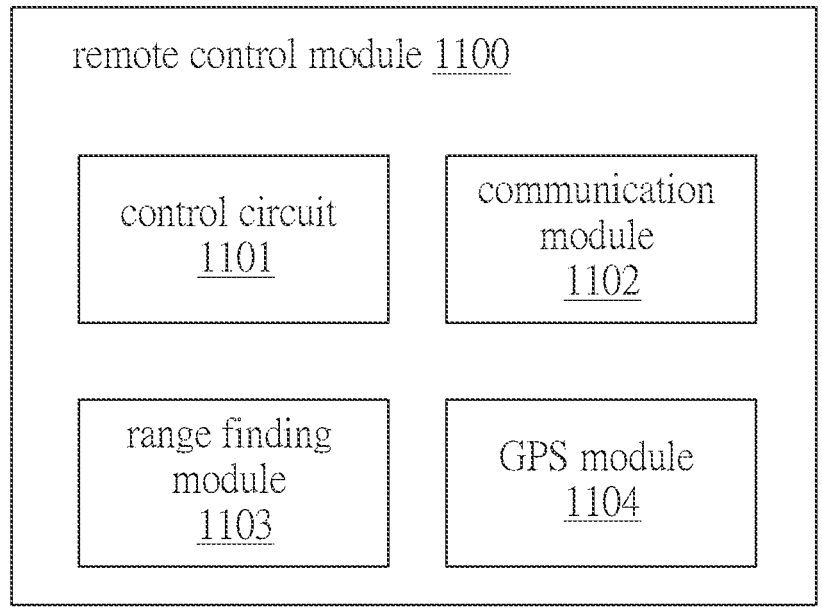
FIG. 5B is a block diagram of a remote control module according to another embodiment of the present invention.

Please refer to FIG. 5B. In other embodiments, the remote control module 1100 may further include a range finding module 1103 and/or a GPS (global positioning system) module 1104. In the embodiment, the range finding module 1103 may sense the distance between the energy storage vehicle 1000 and the surrounding objects. When the range finding module 1103 senses that the distance between the energy storage vehicle 1000 and a surrounding object is less than an alarm value, the remote control module 1100 may generate an alarm signal and transmit the alarm signal to the controller of the energy storage vehicle 1000 through the communication module 1102, so that the controller may react with corresponding control. In the scenario of remote control, the GPS module 1104 may obtain the position of the energy storage vehicle 1000 through the GPS system and report the position to the controller through the communication module 1102.

Figure 6:
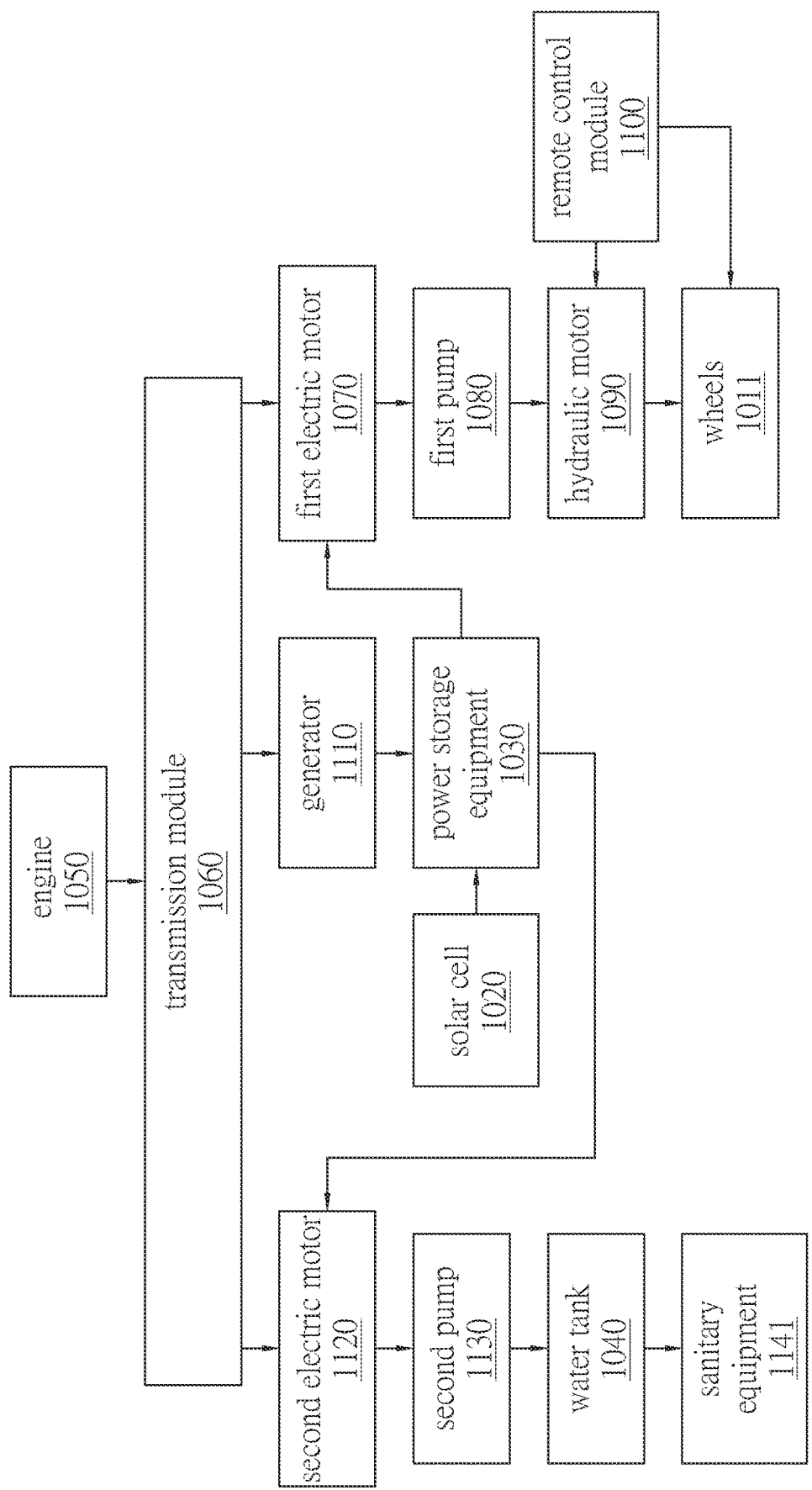
FIG. 6 is a block diagram of a power system according to another embodiment of the present invention.
Figure 8:
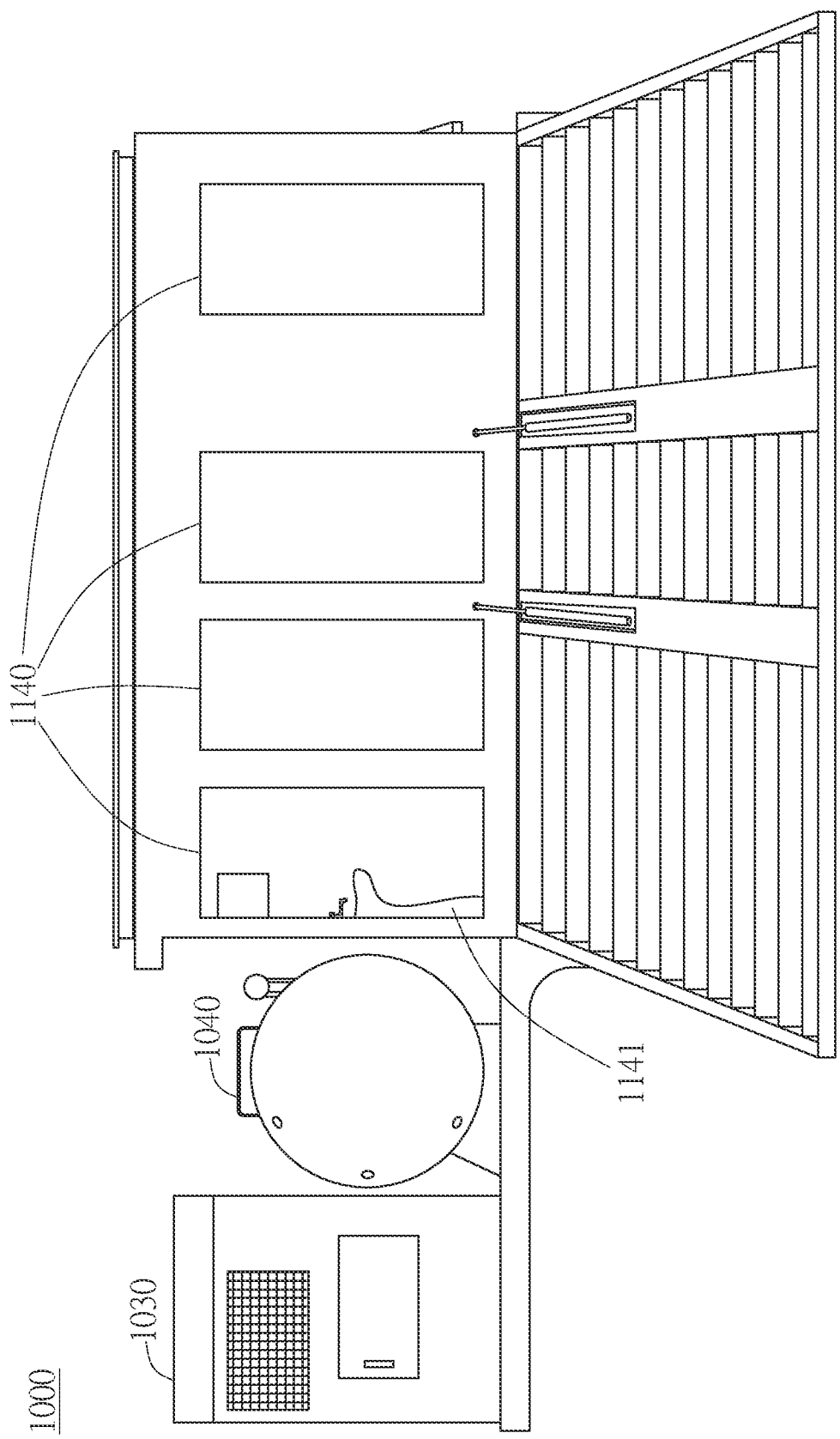
FIG. 8 is a schematic view of an energy storage vehicle according to another embodiment of the present invention.

Please refer to FIG. 6 and FIG. 8. In the embodiment, the energy storage vehicle 1000 may include at least one backup space 1140. For example, the backup space 1140 may be used as a bathroom or a command room. As shown in FIG. 6, in this embodiment, the transmission module 1060 may further include a third output terminal connected to a second electric motor and a third clutch (not shown in FIG. 6) disposed on the third output terminal of the transmission module 1060. The energy storage vehicle may further include the second electric motor 1120 and a second pump 1130 (not shown in FIG. 8), which is disposed in the car body 1100 or on top of the car body 1100. Specifically, the second motor 1120 is connected to the third output terminal of the transmission module 1060 through the third clutch. As shown in FIG. 6, the second electric motor 1120 may drive the second pump 1130 to provide the water stored in the water tank 1040 to a sanitary equipment 1141.

Figure 7:
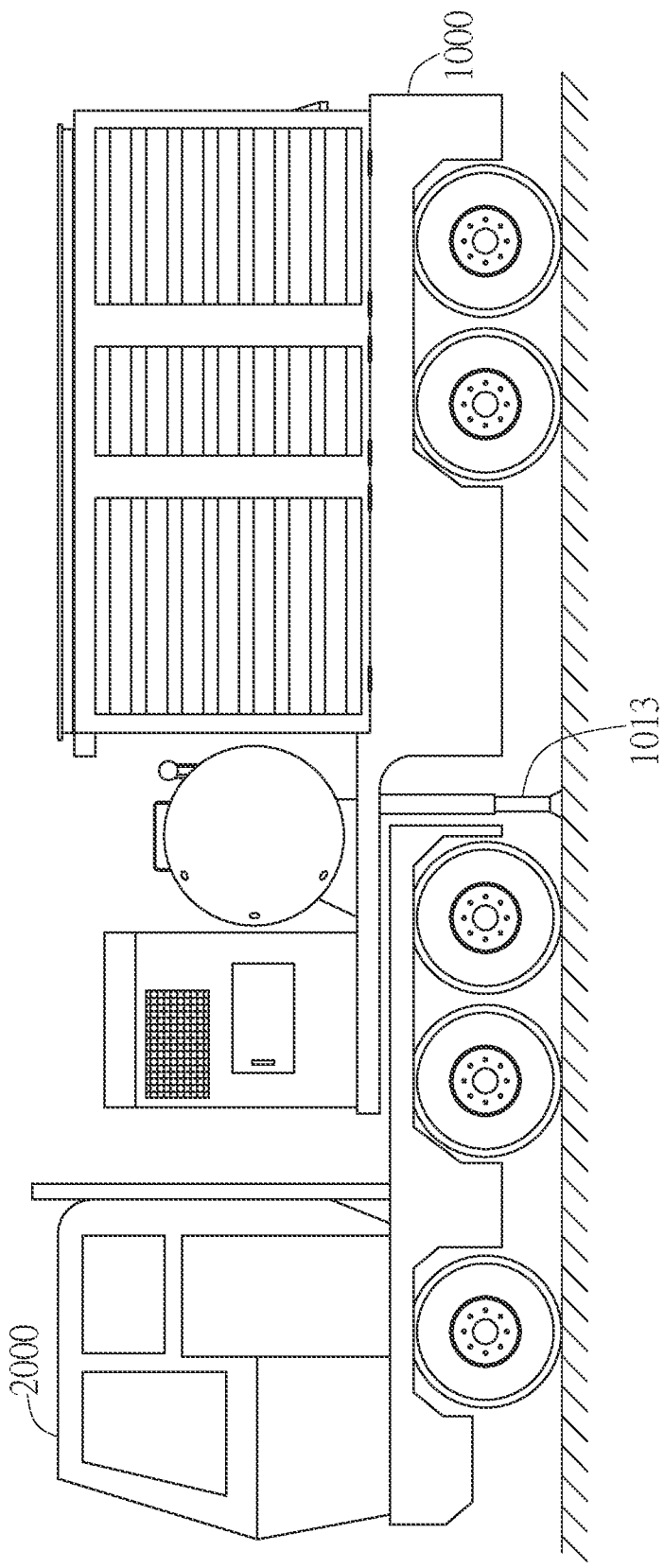
FIG. 7 is a schematic view of an energy storage vehicle cooperated with a tractor unit according to another embodiment of the present invention.

Please refer to FIG. 7. In another embodiment, the energy storage vehicle 1000 may be used as a semi-trailer to connect with a tractor unit 2000. In such an embodiment, the energy storage vehicle 1000 may have a supporting stand 1013 to connect or separate from the tractor unit 2000.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An energy storage vehicle, comprising:
   a solar cell;
   a power storage equipment;
   an engine;
   a transmission module comprising:
      an input terminal driven by the engine;
      a first output terminal;
      a first clutch disposed on the first output terminal;
      a second output terminal; and
      a second clutch disposed on the second output terminal;
   a first electric motor connected to the first output terminal through the first clutch;
   a first pump connected to the first electric motor,
   a hydraulic motor connected to the first pump; and
   a generator connected to the second output terminal through the second clutch;
   wherein:
   the solar cell is disposed on a top surface of the energy storage vehicle,
   the power storage equipment is configured to store electric energy generated by the solar cell and the generator;
   the power storage equipment is electrically connected to the first electric motor; and
   the hydraulic motor is configured to drive multiple wheels of the energy storage vehicle.

2. The energy storage vehicle according to claim 1, further comprising:
   a remote control module configured to control a power output of the hydraulic motor and an orientation of the wheels.

3. The energy storage vehicle according to claim 2, wherein the remote control module further comprises a GPS module.

4. The energy storage vehicle according to claim 3, wherein the remote control vehicle further comprises a range finding module; when the range finding module senses that a distance between the energy storage vehicle and a surrounding object is less than an alarm value, the remote control module generates an alarm signal.

5. The energy storage vehicle according to claim 2, wherein the remote control vehicle further comprises a range finding module; when the range finding module senses that a distance between the energy storage vehicle and a surrounding object is less than an alarm value, the remote control module generates an alarm signal.

6. The energy storage vehicle according to claim 1, wherein:
   the transmission module further comprises a third output terminal and a third clutch disposed on the third output terminal;
   the energy storage vehicle further comprises:
      a second electric motor connected to the third output terminal through the third clutch;
      a second pump connected to the second electric motor;
      a water tank connected to the second pump; and
      a sanitary equipment connected to the water tank through the second pump;
   wherein:
      the power storage equipment is electrically connected to the second electric motor.

7. The energy storage vehicle according to claim 1, further comprising:
   a one-way flywheel disposed between the first electric motor and the first clutch.

8. The energy storage vehicle according to claim 1, further comprising a metal plate, wherein the metal plate constitutes at least a portion of a car body of the energy storage vehicle and has a square wave structure.

9. The energy storage vehicle according to claim 1, further comprising a stand, wherein a car body of the energy storage vehicle is a semi-trailer.

* * * * *